Oct. 3, 1967

R. J. ROCKWELL 3,345,562

AC-DC METER

Filed Aug. 3, 1964

LEGEND

→ METER READING FOR 100v. R.M.S.
-----▷ METER READING FOR 100v. D.C.

INVENTOR.
RONALD J. ROCKWELL
BY *Alden W. Redfield*
*Charles M. Hogan*
ATTORNEYS.

United States Patent Office 3,345,562
Patented Oct. 3, 1967

3,345,562
AC-DC METER
Ronald J. Rockwell, Cincinnati, Ohio, assignor to Crosley Broadcasting Corporation, Cincinnati, Ohio, a corporation of Ohio
Filed Aug. 3, 1964, Ser. No. 387,091
1 Claim. (Cl. 324—119)

ABSTRACT OF THE DISCLOSURE

This is a meter which produces corresponding deflections over a range of direct current and alternating current voltages, within a substantial frequency range, while utilizing a common scale and a single deflecting element. A D'Arsonval meter device electrically provides substantially a resistance parameter. A full wave bridge rectifier has input terminals and a pair of output terminals connected to the D'Arsonval meter device. A capacitor and resistor are connected in shunt with the resistance parameter to comprise, in conjunction with the resistance parameter, a load network for the bridge rectifier, across which network there appear, in response to the application of alternating current voltages to the input terminals, voltages equal to $1/1.414$ of the peak values of said alternating current voltages, whereby the deflections of the deflecting element are alike for direct current voltages and corresponding root mean square values of alternating current voltages. The impedance of the capacitor is small compared to that of said resistor and the values of the capacitor and resistor and resistance parameter are so selected as to render the load network independent of the frequency of the voltages within that frequency range.

---

The present invention relates to voltmeters, and specifically to a D'Arsonval type voltmeter using the same scale for alternating current or direct current (hereinafter referred to as "AC" and "DC") voltages.

An object of the invention is to provide a voltmeter and associated circuit which function in such a manner as to utilize the same scale for both AC and DC voltages and to track accurately throughout the entire scale, no polarity observance being required.

For a better understanding of the invention, together with other objects, advantages, and capabilities thereof, reference is made to the following description of the appended drawings, in which.

Figure 1:
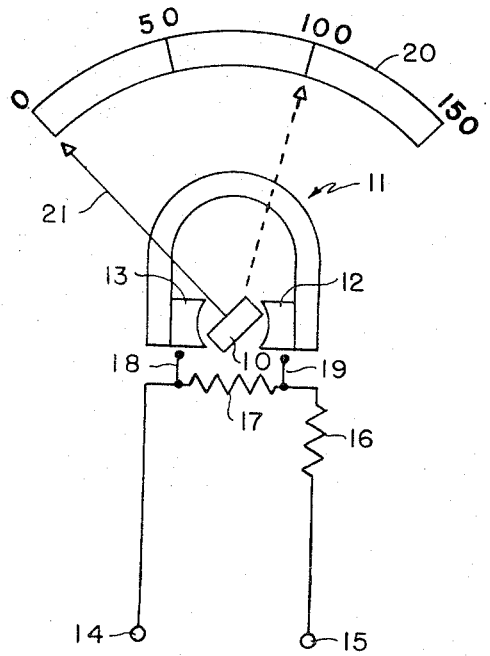
FIG. 1 is a symbolic showing of a conventional DC meter.

In explaining the background against which the necessity for the invention arises, let it be assumed that a conventional D'Arsonval DC voltmeter with a zero to 150 volt scale is connected across a 100 volt DC source (per FIG. 1). Under that circumstance the meter will read 100 volts, assuming proper polarity of the connections.

Parenthetically, FIG. 1 shows the usual D'Arsonval movement comprising an armature 10, a magnetic circuit 11 including poles 12 and 13, input terminals 14 and 15, series multiplying resistor 16, damping resistor 17, and connections 18 and 19 to the armature winding. The D'Arsonval meter further comprises a scale 20 and an indicating pointer 21 secured to the armature 10.

Figure 2:
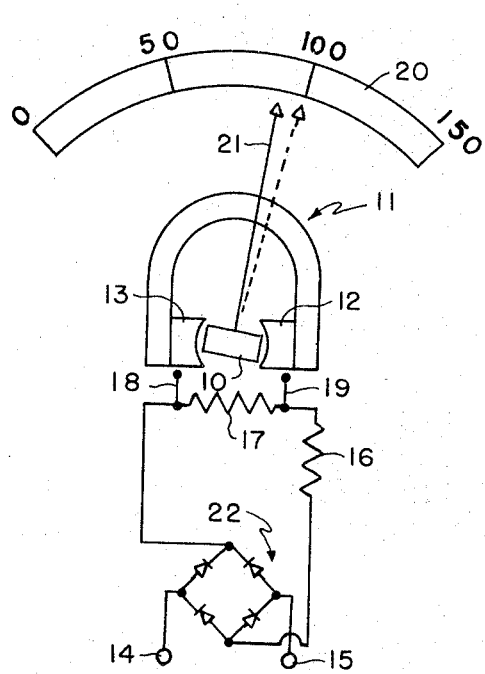
FIGS. 2 and 3 show the FIG. 1 meter modified in ways explained below.

When the FIG. 1 arrangement is connected to an AC source, the meter reads zero. When a full-wave bridge-type rectifier 22 is associated with the meter, as illustrated in FIG. 2, the meter will read 100 volts when connected to a 100 volt DC source and will have no polarity limitations. If the FIG. 2 arrangement is connected to a 100 volt root mean square (R.M.S.) sinusoidal alternating current source, the meter will read approximately 90 volts for a wide band of frequencies (see page 1161 of Radiotron Designer's Handbook, F. Langford-Smith, 4th edition, 1952, distributed by RCA Victor Division, Radio Corporation of America, Harrison, N.J.).

Now, it is known (see page 1169 of the above-cited handbook) that if a capacitor is connected across the output of a rectifier, with no load, the capacitor will charge up to 1.414 of the R.M.S. sinusoidal AC voltage. To achieve this result in the circuit of FIG. 3, wherein the rectifier is loaded by the meter movement and associated resistors, the combination of which represents approximately 10,000, one would employ a capacitor having a negligible impedance, at the frequency involved, with respect to the 10,000 ohm resistance of the meter (this resistance being furnished essentially by resistor 16). For an explanation of how a constant charge may be maintained on this capacitor over a desired range of frequencies, reference is made to page 1180, section (vii), of said Radiotron Designer's Handbook, which sets forth the method for calculating the value of a capacitance that will be sufficiently large to maintain a constant charge with respect to its load at all frequencies involved.

Figure 3:
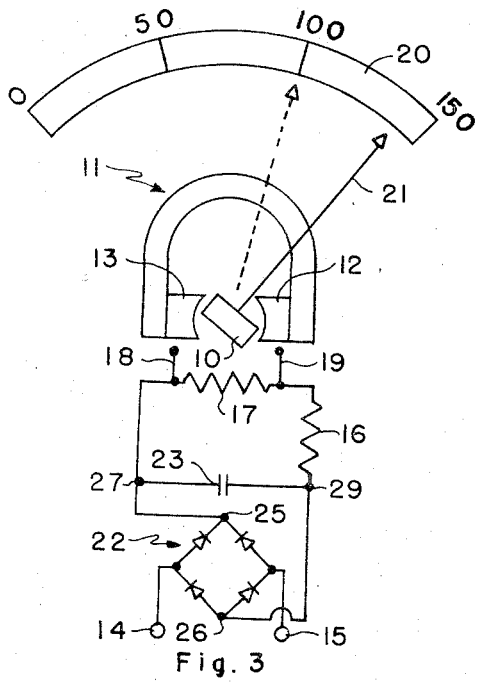

In the circuit of FIG. 3, resistor 16 has a value of approximately 10,000 ohms. When a capacitor 23 having a value of approximately 40 microfarads is connected across the rectifier terminals 25 and 26, the meter, when connected to a 100 volt R.M.S. alternating current source, will read approximately 140 volts over the frequency band desired.

Figure 4:
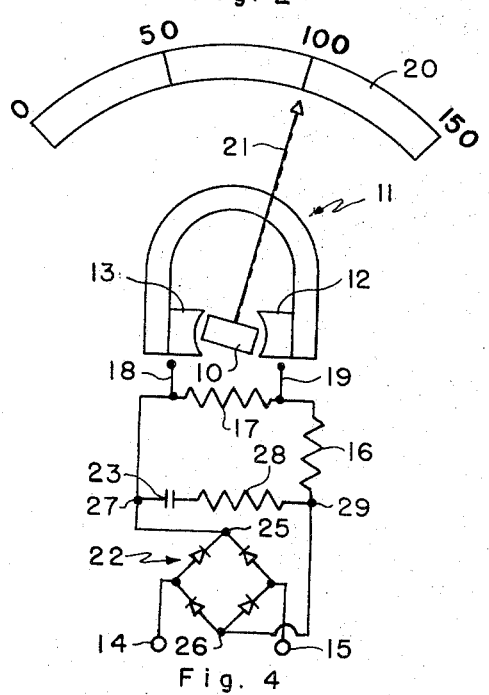
FIG. 4 is a schematic showing, partially in block diagram form, of a combined AC-DC meter and circuit in accordance with the invention.

Now, in order to reduce the 140 volt reading and to produce the correct reading of 100 volts, there is provided, in accordance with the invention, a resistor 28 in series with capacitor 23 (FIG. 4).

The desired value of resistor 28 may be calculated by reference to the ratios shown in figure 30.6, page 1173, of the above-mentioned Radiotron Designer's Handbook. In an embodiment of the invention successfully reduced to practice, the approximate values of the elements 16, 23, and 28 were as follows: resistor 16, 10,000 ohms; capacitor 23, 40 microfarads; resistor 28, 4000 ohms. These parameters were found to be such, when accurately adjusted for calibration, that the meter read 100 volts when connected to either a DC source or an R.M.S. AC source of 100 volts. The meter in accordance with the invention requires no observance of polarity when measuring DC voltage, and tracks accurately at all points. The particular meter employed in the embodiment reduced to practice was a Westinghouse type GL, D'Arsonval movement. The four rectifiers in the rectifier network 22 were type 4–1N2071.

While the preferred embodiment of the invention employs full-wave rectification, it is within the scope of the invention to utilize a half-wave rectifier. However, under this condition correct polarity must be observed when reading DC voltages, since conduction occurs only with one polarity.

The invention as shown in FIG. 4 has a number of advantages. It accurately reads direct current voltages and a wide band of AC voltages ranging from 5 cycles per second to 5,000 cycles per second. It eliminates the requirement of observing correct polarity when metering DC voltages.

While there has been shown and described what is at present considered to be the preferred embodiment of the invention, it will be obvious to those skilled in the art that various modifications and changes may be made therein without departing from the true scope of the invention as defined by the appended claim.

I claim:

A meter which produces corresponding deflections over a range of direct current and alternating current voltages, within a substantial frequency range, while utilizing a common scale and a single deflecting element comprising:
- a meter device mechanically comprising said single scale and said single deflecting element and electrically constituting substantially an impedance,
- a rectifier having input terminals to which voltages to be measured are applied, and coupled to said meter device, whereby direct current flowing in said impedance as the result of the application of voltages to said input terminals energizes the meter device to deflect said deflecting element,
- and means connected in shunt with said impedance and comprising in conjunction with the impedance a load network for the rectifier, across which network there appear, in response to the application of alternating current voltages to the input terminals, voltages equal to $1/1.414$ of the peak values of said alternating current voltages, whereby the deflections of the deflecting element are alike for direct current voltages and corresponding root mean square values of alternating current voltages, said means comprising the combination of a capacitor and a resistor in series, the magnitude of the impedance of said capacitor being small compared to that of said resistor and the values of said capacitor and resistor and the impedance constituted by said meter device being so selected as to render said load network independent of the frequency of the alternating current voltages within that frequency range.

References Cited

UNITED STATES PATENTS

| | | | |
|---|---|---|---|
| 1,253,212 | 1/1918 | Chubb | 324—119 |
| 1,800,474 | 4/1931 | Scherer | 324—119 X |
| 1,799,683 | 4/1931 | Geiger | 324—119 |
| 1,811,319 | 6/1931 | Johnson | 324—119 X |
| 1,895,812 | 1/1933 | Morecroft | 324—119 X |
| 2,290,559 | 7/1942 | Hitchcock | 324—119 |

RUDOLPH V. ROLINEC, *Primary Examiner.*

WALTER L. CARLSON, *Examiner.*

J. J. MULROONEY, E. F. KARLSEN,
*Assistant Examiners.*